United States Patent
Iwasawa

(10) Patent No.: US 8,420,998 B2
(45) Date of Patent: Apr. 16, 2013

(54) TARGET DETECTING AND DETERMINING METHOD FOR DETECTING AND DETERMINING TARGET BASED ON HEIGHT INFORMATION AND STORAGE MEDIUM FOR STORING PROGRAM EXECUTING TARGET DETECTING AND DETERMINING METHOD

(75) Inventor: Masashi Iwasawa, Shiga (JP)

(73) Assignee: Optex Co., Ltd., Otsu, Shiga ( * ) Notice: Subject to any disclaimer, the term of this patent is extended or adjusted under 35 U.S.C. 154(b) by 459 days.

(21) Appl. No.: 12/255,198

(22) Filed: Oct. 21, 2008

(65) Prior Publication Data

US 2009/0108184 A1   Apr. 30, 2009

(30) Foreign Application Priority Data

Oct. 26, 2007   (JP) ................... 2007-279651

(51) Int. Cl.
*G06M 7/00* (2006.01)
*G01J 1/20* (2006.01)

(52) U.S. Cl.
USPC ........................ 250/221; 250/203.1

(58) Field of Classification Search ........ 356/3.01–3.03, 356/3.06, 3.09, 4.01, 4.03, 4.08, 5.01–5.09, 356/27–28, 139.1, 140, 141.1–141.5, 623; 340/540, 541, 545.3, 555–557, 573.1, 573.4, 340/573.2, 573.3; 250/203.1, 221, 203.2, 250/206, 206.1, 206.3, 206.2, 208.1, 214 R, 250/214 AL, 214 B, 559.19, 202, 559.29, 250/559.38, 559.4, 338.1, 341.8, 347, 370.1

See application file for complete search history.

(56) References Cited

U.S. PATENT DOCUMENTS

| | | | | | |
|---|---|---|---|---|---|
| 3,877,157 | A | * | 4/1975 | Ashford et al. | 434/22 |
| 5,365,218 | A | * | 11/1994 | Otto | 340/557 |
| 5,910,767 | A | * | 6/1999 | Frucht | 340/557 |
| 6,014,220 | A | * | 1/2000 | Kimura | 356/400 |
| 6,304,321 | B1 | | 10/2001 | Wangler et al. | |
| 6,583,403 | B1 | | 6/2003 | Koike et al. | |
| 6,617,999 | B2 | * | 9/2003 | Kondo et al. | 342/70 |
| 2003/0112142 | A1 | | 6/2003 | Izumi et al. | |
| 2006/0267764 | A1 | | 11/2006 | Morinaga et al. | |

FOREIGN PATENT DOCUMENTS

| | | |
|---|---|---|
| JP | H07-160956 A | 6/1995 |
| JP | 3011121 B | 12/1999 |
| WO | WO-2007/029610 A1 | 3/2007 |

OTHER PUBLICATIONS

Office Action of the corresponding European Application No. 08 018 380.9 dated Jun. 29, 2010.

* cited by examiner

*Primary Examiner* — Que T Le
*Assistant Examiner* — Jennifer Bennett
(74) *Attorney, Agent, or Firm* — Global IP Counselors, LLP

(57) ABSTRACT

In a target detecting technique using a laser sensor, misdetection can be reduced while maintaining a wide detecting range. A target detecting method for detecting a target by emitting a laser beam diagonally downward from an installing position of a laser emitting and receiving portion. The method includes the steps of: obtaining distance information from the laser emitting and receiving portion to an object to be detected; determining, when the object to be detected approaches the laser emitting and receiving portion, whether the tracking of the object to be detected is stopped or not; and determining, when the tracking of the object to be detected is stopped, whether the object to be detected is the target or a non-target based on distance information immediately before the tracking of the object to be detected is stopped.

4 Claims, 6 Drawing Sheets

TARGET DETECTING AND DETERMINING METHOD FOR DETECTING AND DETERMINING TARGET BASED ON HEIGHT INFORMATION AND STORAGE MEDIUM FOR STORING PROGRAM EXECUTING TARGET DETECTING AND DETERMINING METHOD

CROSS-REFERENCE TO RELATED APPLICATIONS

This application claims priority under 35 U.S.C. §119 to Japanese Patent Application No. 2007-279651 filed on Oct. 26, 2007. The entire disclosure of Japanese Patent Application No. 2007-279651 is hereby incorporated herein by reference.

BACKGROUND OF THE INVENTION

1. Field of the Invention

The present invention relates to a target detecting device, a target detecting method, and a target detecting program, which detect a target. More specifically, the present invention relates to a target detecting device, a target detecting method, and a target detecting program, which detect a target by emitting and receiving a laser beam.

2. Background Information

A burglarproof system typically has a detecting device which detects a human who intrudes into a predetermined guarding area (hereinafter, referred to as an "intruder"), and an alarm generating device which generates an alarm based on a detected result. The detecting device is an infrared sensor or a laser sensor, which detects the intruder using a light beam. The alarm device permits lighting or flashing of an illuminating lamp and sounding of an alarm buzzer or a siren. The alarm device transmits an alarm signal to a facility to be guarded or a remote place. The burglarproof system further has an image displaying device which images the guarding area to display its image.

To increase the detecting accuracy of a target, the laser sensor using a laser beam has been received attention as the detecting device. The laser sensor has a laser pulse generator (for example, including a laser diode), and a photodetector (for example, including an avalanche photodiode). The laser pulse generator generates a laser pulse wave. The photodetector detects a reflection light reflected from the target. Flight time, that is, reflection time is computed to measure a distance from the laser sensor to the target. A scan mechanism portion may further be provided to rotate a laser optical axis, and in this case, two-dimensional distance information can be obtained. Therefore, a wide monitoring area can be set (see U.S. Pat. No. 3,011,121).

The detecting device used for the burglarproof system need to be set so as to reliably detect a human and not to detect a small animal such as a dog or a cat. The detecting device often detects the small animal as the human to output a human body detecting signal, resulting in lowering of the reliability of the burglarproof system. To prevent misdetection, it is considered that the difference in height between the human and the small animal is used to install the laser sensor horizontally at about the height of a waist of an adult. In this case, the human is detected and the small animal is not detected. When the laser sensor is installed horizontally in a low position and an obstruction of about the height of the human exists between the laser sensor and the guarding area, it is difficult to avoid occurrence of a plurality of undetectable areas in the guarding area.

SUMMARY OF THE INVENTION

An object of the present invention is to reduce the misdetection while maintaining a wide detecting range in a target detecting technique using a laser sensor.

In a first aspect of the present invention, a target detecting device is a device for detecting a target by emitting and receiving a laser beam and has a laser emitting and receiving portion, a distance information obtaining portion, a tracking stop determining portion, and a target determining portion. The laser emitting and receiving portion can emit the laser beam diagonally downward from an installing position. The distance information obtaining portion can obtain distance information from the laser emitting and receiving portion to an object to be detected. The tracking stop determining portion, when the object to be detected approaches the laser emitting and receiving portion, can determine whether the tracking of the object to be detected is stopped or not. The target determining portion, when the tracking of the object to be detected is stopped, can determine whether the object to be detected is the target or a non-target based on distance information immediately before the tracking of the object to be detected is stopped.

In the target detecting device, the laser beam is emitted diagonally downward from the laser emitting and receiving portion so that a wide detecting range can be maintained. When the tracking of the object to be detected is stopped, it can be determined whether the object to be detected is the target or the non-target based on the distance information immediately before the tracking of the object to be detected is stopped. Therefore, the misdetection can be reduced while maintaining a wide detecting range.

In a second aspect of the present invention, the target detecting device according to the first aspect of the present invention, wherein the target determining portion, if the distance information immediately before the tracking of the object to be detected is stopped shows a predetermined length or above, determines that the object to be detected is the target, and if the distance information immediately before the tracking of the object to be detected is stopped shows less than the predetermined length, determines that the object to be detected is the non-target.

In the target detecting device, it is determined that the object to be detected of the predetermined height or above is the target and that the object to be detected of less than the predetermined height is the non-target.

In a third aspect of the present invention, the target detecting device according to the first or second aspect of the present invention, further includes a scan mechanism portion. The scan mechanism can change the direction of the laser beam emitted from the laser emitting and receiving portion.

In the target detecting device, the direction of the laser beam emitted from the laser emitting and receiving portion can be changed by the scan mechanism portion. Therefore, the angle of the laser emission light, for example, is changed to detect the target in a two-dimensional area.

In a fourth aspect of the present invention, a target detecting method for detecting a target by emitting a laser beam diagonally downward from an installing position of a laser emitting and receiving portion, includes the following steps.

The step of obtaining distance information from the laser emitting and receiving portion to an object to be detected.

The step of determining, when the object to be detected approaches the laser emitting and receiving portion, whether the tracking of the object to be detected is stopped or not.

The step of determining, when the tracking of the object to be detected is stopped, whether the object to be detected is the target or a non-target based on distance information immediately before the tracking of the object to be detected is stopped.

In the target detecting method, the laser beam is emitted diagonally downward from the laser emitting and receiving portion so that a wide detecting range can be maintained. When the tracking of the object to be detected is stopped, it can be determined whether the object to be detected is the target or the non-target based on the distance information immediately before the tracking of the object to be detected is stopped. Therefore, the misdetection can be reduced while maintaining a wide detecting range.

In a fifth aspect of the present invention, the target detecting method according to the fourth aspect of the present invention, wherein the target determining step, if the distance information immediately before the tracking of the object to be detected is stopped shows a predetermined length or above, determines that the object to be detected is the target, and if the distance information immediately before the tracking of the object to be detected is stopped shows less than the predetermined length, determines that the object to be detected is the non-target.

In the target detecting method, it is determined that the object to be detected of the predetermined height or above is the target and that the object to be detected of less than the predetermined height is the non-target.

In a sixth aspect of the present invention, the target detecting method according to the fourth aspect of the present invention, wherein the target determining step, when the laser emitting and receiving portion emits the laser beam in an almost vertical direction, determines whether the object to be detected is the target or the non-target using the distance information immediately before the tracking of the object to be detected is stopped, as height information of the object to be detected.

In the target detecting method, when the laser emitting and receiving portion emits the laser beam in the almost vertical direction, it is determined that the object to be detected of the predetermined height or above is the target and that the object to be detected of less than the predetermined height is the non-target.

In a seventh aspect of the present invention, a target detecting program is a program that allows a computer to execute the target detecting method according to any one of the fourth to sixth aspect of the present invention.

In the target detecting program, the misdetection can be reduced while maintaining a wide detecting range.

In the target detecting device, the target detecting method, and the target detecting program according to the present invention, the misdetection can be reduced while maintaining a wide detecting range.

These and other features, aspects and advantages of the present invention will become apparent to those skilled in the art from the following detailed description, which, taken in conjunction with the annexed drawings, discloses example embodiment of the present invention.

DETAILED DESCRIPTION OF THE INVENTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

In the following description, terms "guarding area", "detecting area", and "monitoring area" refer to a position in proximity to illumination of a laser emission light beam, and for example, include an area in which a human who is passing therethrough is illuminated with a laser beam. The term "target" is referred to as an object to be detected by a laser sensor and, in this embodiment, a human. The term "non-target" is referred to as an object which is unpreferable to be detected as the target and, in this embodiment, a small animal. The term "object to be detected" is referred to as an object in which it has not yet been determined whether it is the target or the non-target though its existence is detected.

1. First Embodiment (1) Configuration of a Laser Sensor Device

Figure 1:
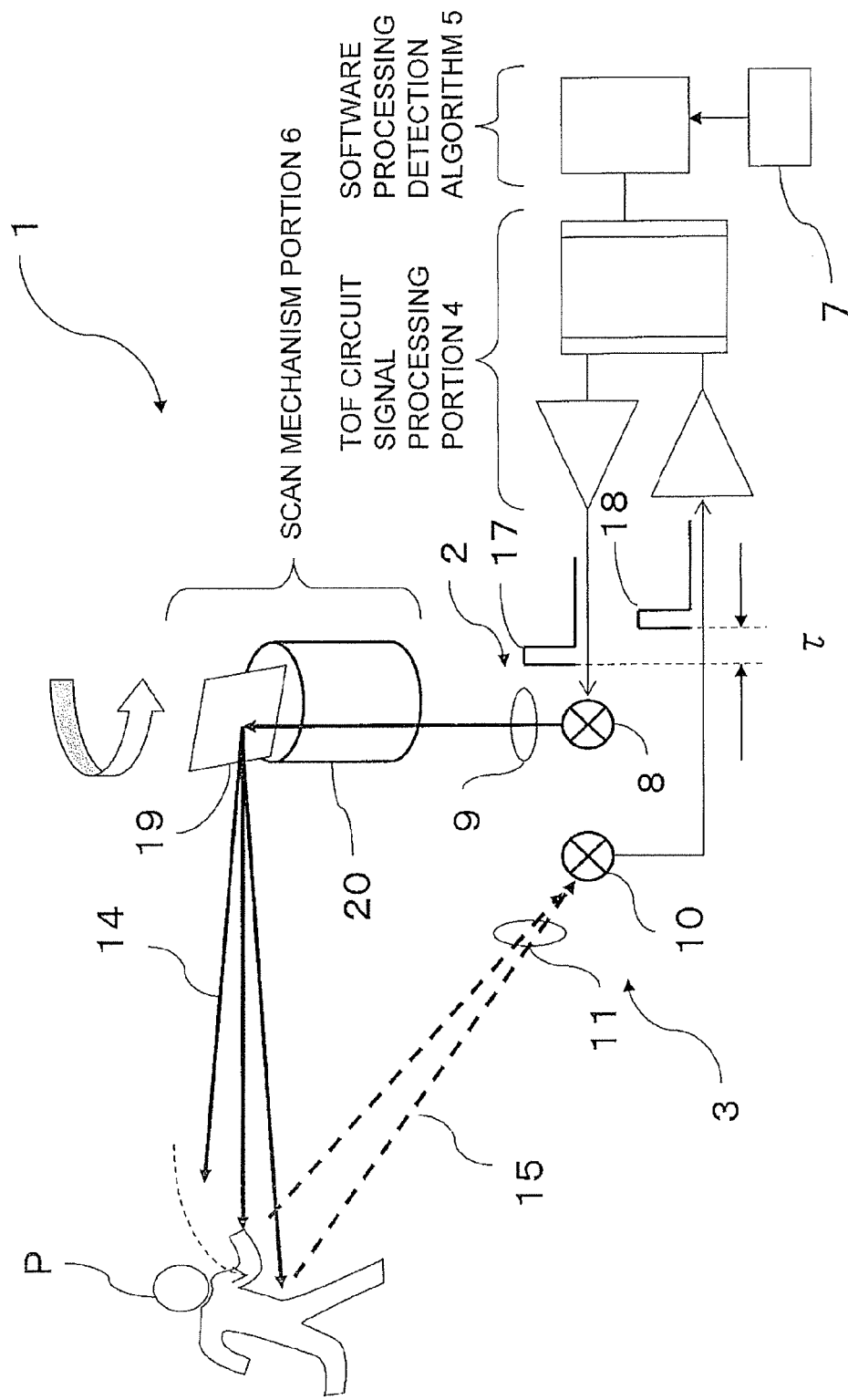
FIG. 1 is a block diagram illustrating a schematic configuration of a laser sensor device according to an embodiment of the present invention.

FIG. 1 is a block diagram illustrating a schematic configuration of a laser sensor device 1 according to an embodiment of the present invention. The laser sensor device 1 is a device which emits a laser beam and then receives reflection light from a target to detect the target. The laser sensor device 1 is mainly used for burglar prevention in an area or a space having a predetermined range, such as a periphery of an entrance of a building, an open space, and an outside of a fence. Specifically, the laser sensor device 1 is used for detecting an existence of an intruder in the guarding area.

The laser sensor device 1 is combined with an alarm device and an image displaying device to configure a burglarproof system. The alarm device permits lighting or flashing of an illuminating lamp and sounding of an alarm buzzer or a siren. In some cases, the alarm device transmits an alarm signal to a facility to be guarded or a remote place. The image displaying device has a camera or a displaying device, and images and displays the image of the guarding area.

The laser sensor device 1 mainly has a laser emitting portion 2 which is a laser pulse generator, a laser receiving portion 3 which is a photodetector, a TOF circuit signal processing portion 4, a software processing detection algorithm 5, a scan mechanism portion 6, and an angle sensor 7. The laser sensor device 1 is, for example, installed in an upper position of a building and is used to have, as the monitoring area, an area diagonally downward therefrom. The laser sensor device 1 is preferably installed in the position at least above an average height of an adult.

The laser emitting portion 2 mainly has a laser diode 8 and a light transmitting lens 9. The laser diode 8 emits laser emission light (laser pulse wave) 14. The laser emission light 14 passes through the light transmitting lens 9 so as to be directed to the detecting area by the scan mechanism portion 6 (described later).

The laser receiving portion 3 mainly has an avalanche photodiode 10 and a light receiving lens 11. For example, laser reflection light 15 from a person to be detected P passes through the light receiving lens 11 so as to be incident onto the avalanche photodiode 10.

The TOF (Time of Flight) circuit signal processing portion 4 transmits a driving signal 17 to the laser diode 8, receives a detecting signal 18 from the avalanche photodiode 10, and performs signal processing based on the detection signal 18. The TOF is a distance measuring technique which measures time during which a light pulse is moved to and returns from the surface of the target and then calculates the distance based on the measured time and a light speed.

The software processing detection algorithm 5 is an algorithm which performs information processing by a computer and is realized by hardware (a CPU and memory) and software (a program). The software processing detection algorithm 5 has a distance information detecting portion, a tracking stop determining portion and a receiving portion. The distance information detecting portion can obtain distance information from the laser emitting and receiving portion (2, 3) to the object to be detected. The tracking stop determining portion can, when the object to be detected approaches the laser emitting and receiving portion, determine whether the tracking of the object to be detected is stopped or not. The target determining portion can, when the tracking of the object to be detected is stopped, determine whether the object to be detected is the target or the non-target based on distance information immediately before the tracking of the object to be detected is stopped. The operation of the software processing detection algorithm 5 will be described later.

The scan mechanism portion 6 mainly has a mirror 19 and a driving portion 20. The mirror 19 reflects the laser emission light 14 from the laser emitting portion 2. The driving portion 20 rotates the mirror 19 to change the direction of the laser emission light 14. The scan mechanism portion 6 can change the direction of the laser emission light 14 from the laser emitting portion 2 right and left to detect the target in a two-dimensional area.

Figure 4:
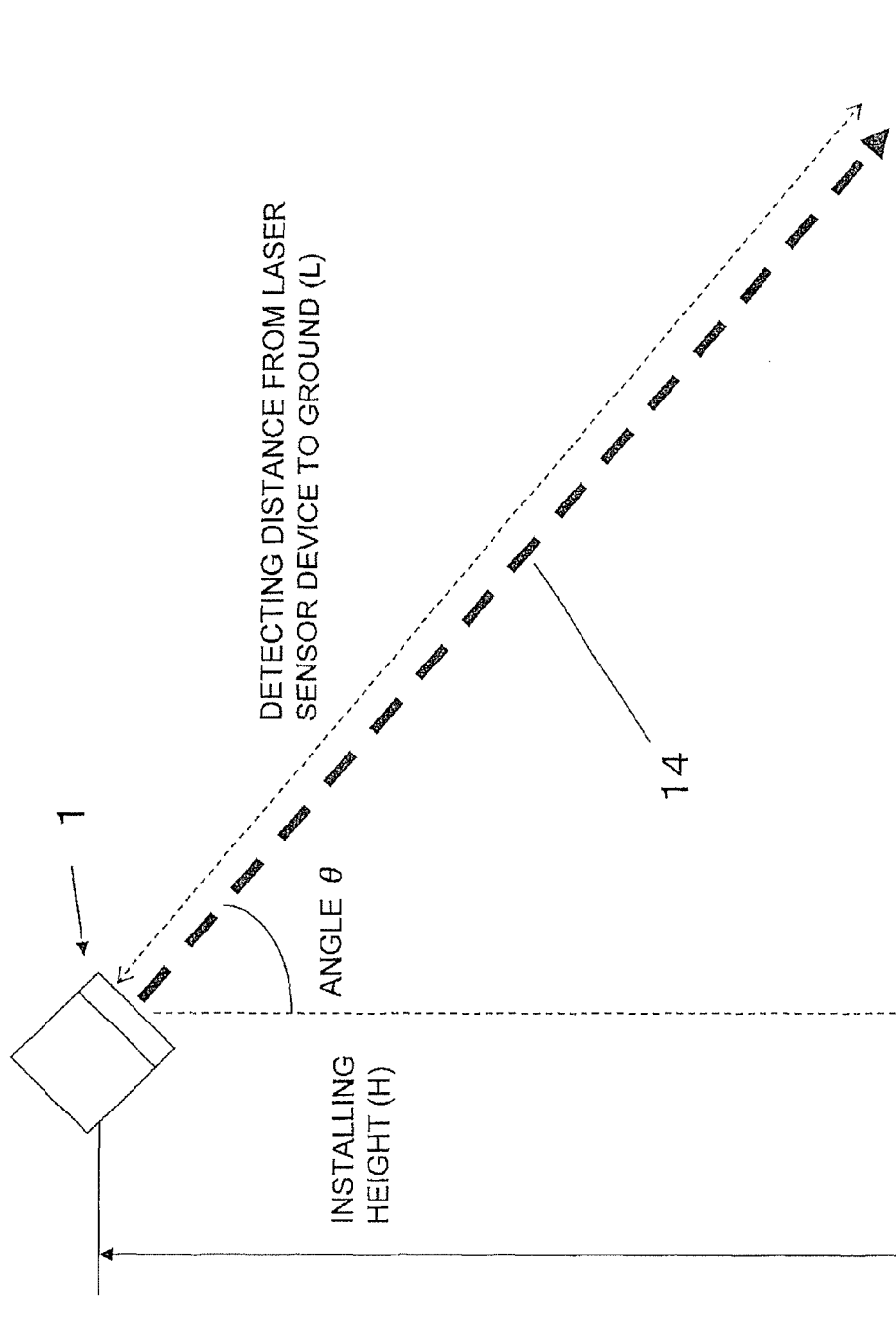
FIG. 4 is a schematic diagram of assistance in describing an operation of identifyings a height position from ground by the laser sensor device.

The angle sensor 7 is a device which determines an angle θ defined between the direction of the laser sensor device 1 (the direction of the laser emission light 14) and the vertical direction (see FIG. 4). Using the angle sensor, angle information of the laser emission light 14 can be automatically obtained when the laser sensor device 1 is installed. Any special operation is unnecessary, therefore, the operability is good.

Figure 2:
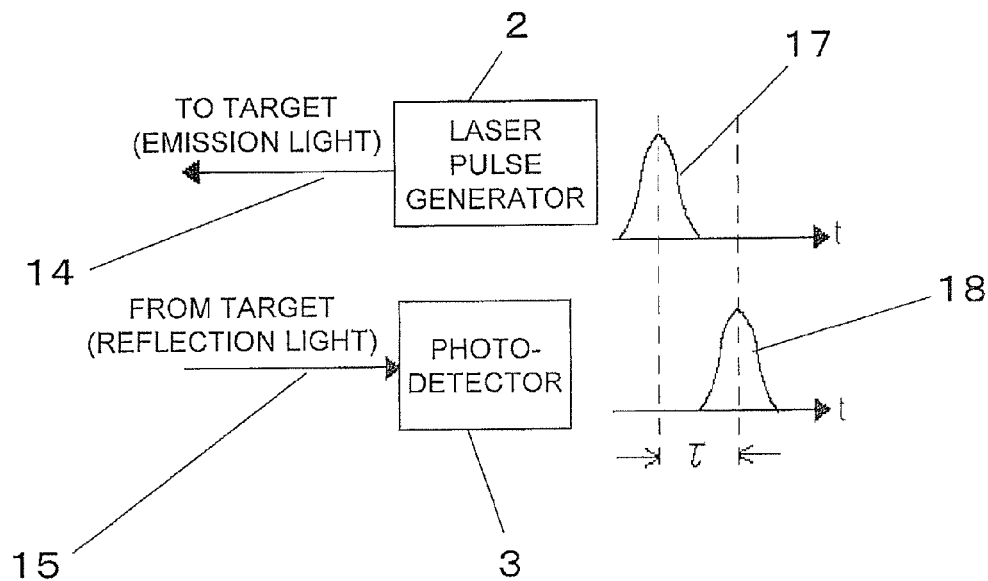
FIG. 2 is a diagram illustrating a detail of a driving signal inputted to a laser diode and a detecting signal outputted from an avalanche photodiode.

FIG. 2 illustrates a detail of the driving signal 17 inputted to the laser diode 8 and the driving signal 18 outputted from the avalanche photodiode 10. The driving signal 17 illustrated in FIG. 2 is inputted to the laser diode 8, and the laser diode 8 emits the laser emission light 14. The avalanche photodiode 10 receives the laser reflection light 15 to output the detecting signal 18. As is apparent from FIG. 2, a time difference τ between center positions of both the signals 17 and 18 is a time difference of both the signals 17 and 18 (light reciprocating time). The interval between the signals 17 and 18 is 34.7 μs, and the pulse width of each of the signals is 34 ns.

Figure 3:
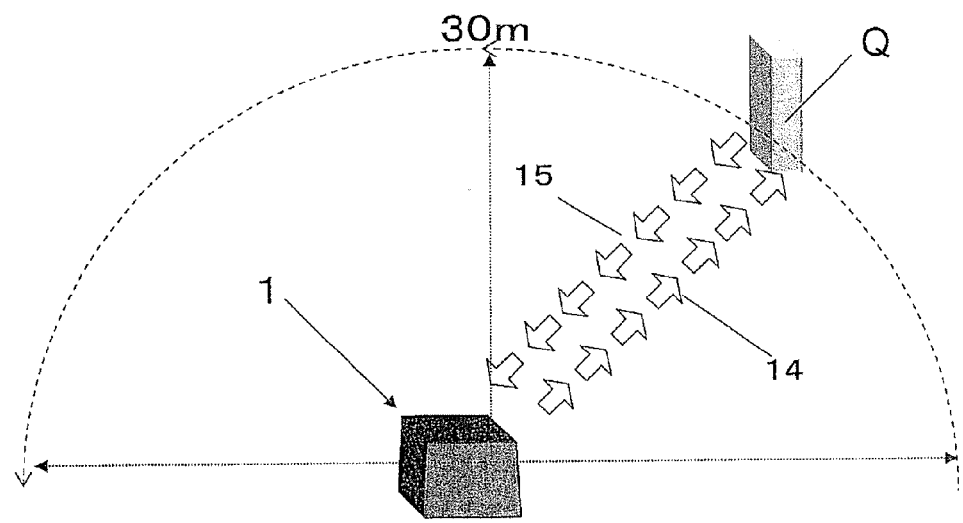
FIG. 3 is a diagram of assistance in describing a scan area of the laser sensor device.

FIG. 3 is a diagram of assistance in describing the monitoring area of the laser sensor device 1. As described above, in the laser sensor device 1, scanning with the laser emission light 14 is performed by the scan mechanism portion 6 in a predetermined angle range. In FIG. 3, scanning with the laser emission light 14 is performed in the range of 180 degrees of an arc having a radius of 30 m. The scan distance of 30 m means that a spot of the laser emission light 14 is positioned at the height from the ground on the point of 30 m horizontally from the laser sensor device 1. Therefore, the guarding area of the laser sensor device 1 is an annular area inwardly a distance of about several meters from the point of 30 m (guarding distance) horizontally from the laser sensor device 1. As is apparent from FIG. 3, an intruder Q who intrudes into the guarding area is illuminated with the laser emission light 14, and then reflects the laser reflection light 15. As an example, when the laser emission light 14 is rotated by 0.25 degrees, the direction of the laser emission light 14 is changed 720 times with 180 degrees. In the position of the radius of 30 m (guarding distance position), the laser emission light 14 is moved with a pitch of 13 cm.

(2) Operation of the Software Processing Detection Algorithm

Figure 7:
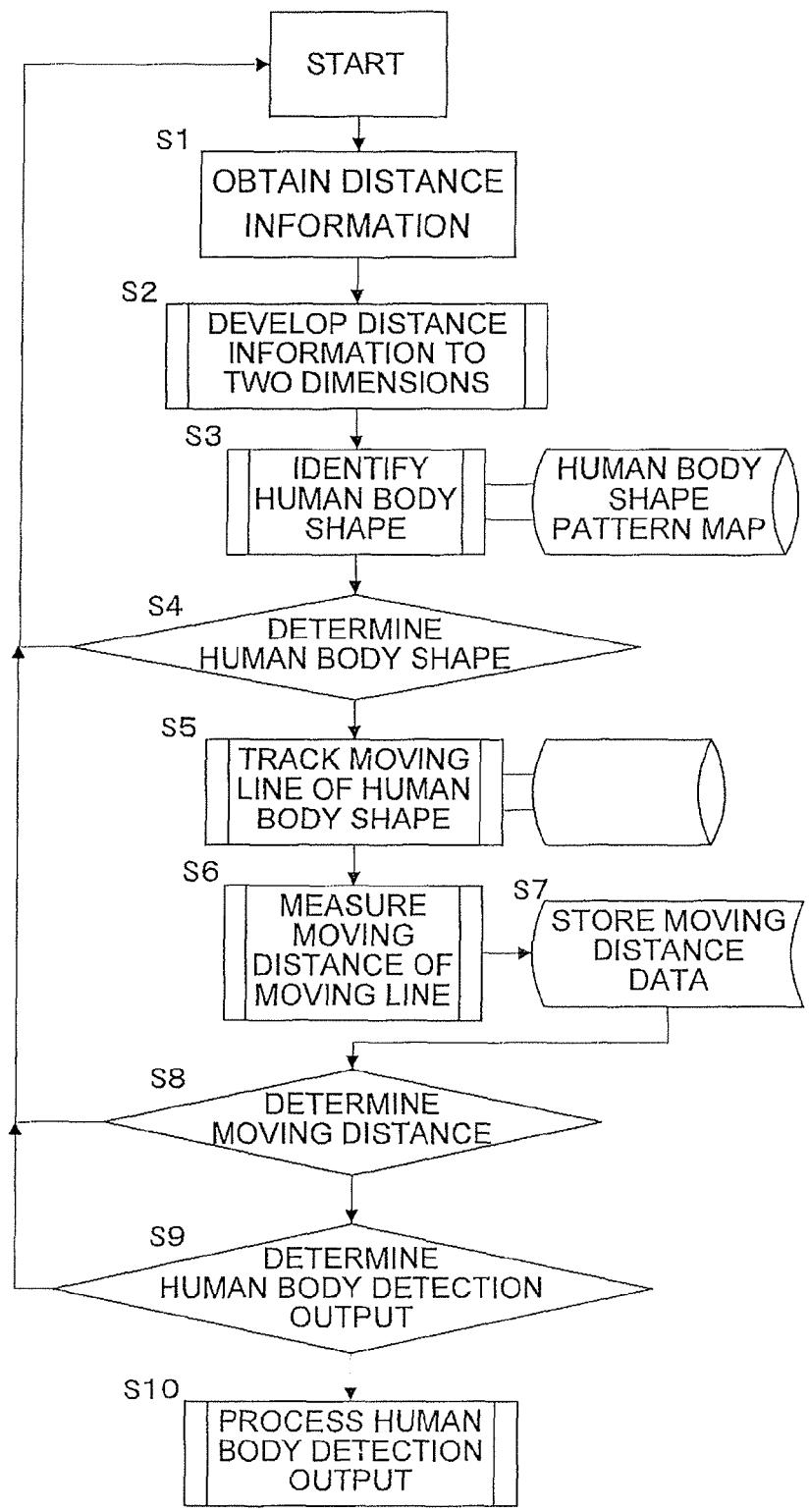
FIG. 7 is a flowchart illustrating human body detection processing of a software processing detection algorithm.

FIG. 7 is a flowchart illustrating human body detection processing of the software processing detection algorithm 5.

In step S1, distance information by the angle scanned by the sensor is inputted to the CPU. The distance information of rotation 720 times by the angle of 0.25 degrees is inputted from the TOF circuit signal processing portion 4.

In step S2, the distance information by the angle is developed to plane information in the CPU.

In step S3, an identified human body shape in the plane information is compared with a human body shape pattern map. The human body shape pattern is previously stored in a hard disk or another memory device.

In step S4, human body shape determination is performed. If it is determined that the identified human body shape is not the human body shape, the processing is ended and the routine returns to start. If it is determined that the identified human body shape is the human body shape, the routine is moved to step S5.

In step S5, the moving line tracking of the human body shape is performed. The identified human body shape in the continuously changed plane information is compared with the human body shape pattern map.

In step S6, the moving distance of the moving line is measured. The moving line tracking is continuously performed to measure its moving distance. For example, assume that the object to be detected intrudes into the guarding area to move to the laser sensor device 1. The object to be detected is scanned with the laser emission light 14 from its lower portion to its upper portion, and finally, its topmost portion is scanned. The next moment the scanning of the object to be detected is stopped, and the laser reflection light 15 from the object to be detected is not generated. Immediately before the scanning of the object to be detected is stopped, the topmost portion of the object to be detected is illuminated with the laser emission light 14. That is, when the object to be detected intrudes into the guarding area to approach the laser sensor device 1 and the moving line tracking is then stopped, detecting distance information detected immediately before the tracking is stopped is obtained. Both the height of the object to be detected and an intruding distance can be computed based on the detecting distance information and the angle information obtained by the angle sensor 7. The above contents will be described below in detail.

FIG. 4 is a schematic diagram of assistance in describing an operation of identifyings an installing height (H) from the ground by the laser sensor device 1. The object to be detected does not exist in this case, and the laser emission light 14 is applied to the ground. The distance information obtaining portion of the software processing detection algorithm 5 obtains the time difference τ between both the signals 17 and 18 inputted from the TOF circuit signal processing portion 4 to compute a detecting distance L from the laser sensor device 1 to the ground based on the time difference. The software processing detection algorithm 5 can obtain the angle θ formed between the emitting direction of the laser emission light 14 and the vertical direction by the angle sensor 7. The software processing detection algorithm 5 can obtain the installing height (H) by an expression H=cos θ×L.

Figure 5:
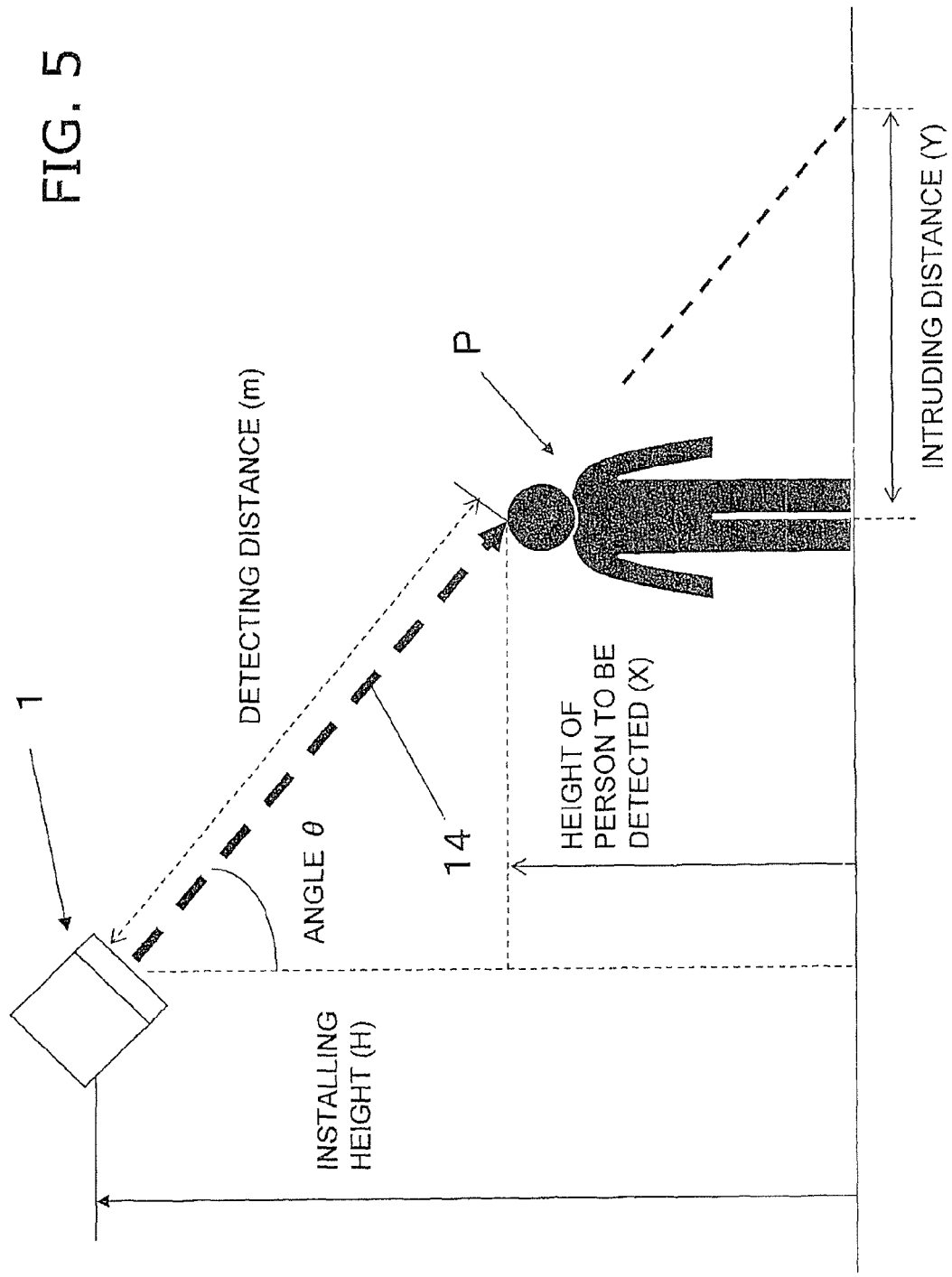
FIG. 5 is a schematic diagram of assistance in describing an operation of identifying the height position of a head of a human by the laser sensor device.

FIG. 5 is a schematic diagram of assistance in describing an operation of identifying the height position of a head of the person to be detected P by the laser sensor device 1. The person to be detected Q intrudes toward the laser sensor device 1 at a distance (Y) from the position where the spot of the laser emission light 14 is positioned on the ground. The distance information obtaining portion of the software processing detection algorithm 5 obtains the time difference τ between both the signals 17 and 18 inputted from the TOF circuit signal processing portion 4 to compute a detecting distance (m) from the laser sensor device 1 to the head of the intruder P based on the time difference. The software processing detection algorithm 5 can obtain a height X of the person to be detected P by the expression X=H−cos θ×m. The software processing detection algorithm 5 can obtain the intruding distance (Y) by the expression Y=sin θ×(L−m).

Figure 6:
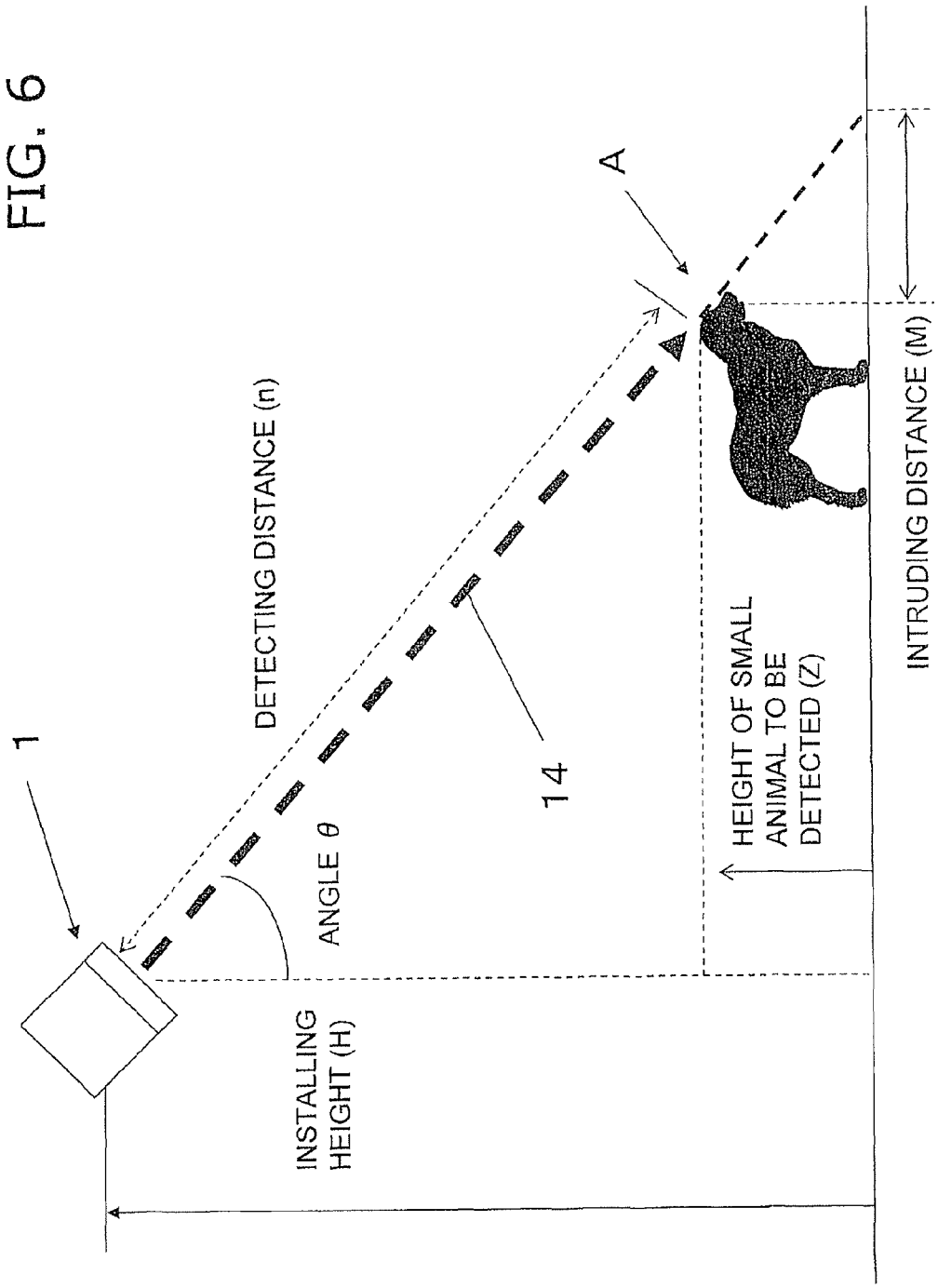
FIG. 6 is a schematic diagram of assistance in describing an operation of identifying the height position of a head of a dog by the laser sensor device.

FIG. 6 is a schematic diagram of assistance in describing an operation of the laser sensor device 1 which identifies the height position of the head of a small animal to be detected A. In this case, the small animal to be detected A intrudes toward the laser sensor device 1 at a distance (M) from the position where the spot of the laser emission light 14 is positioned on the ground. The distance information obtaining portion of the software processing detection algorithm 5 obtains the time difference τ between both the signals 17 and 18 inputted from the TOF circuit signal processing portion 4 to compute a detecting distance (n) from the laser sensor device 1 to the head of the small animal to be detected A based on the time difference. The software processing detection algorithm 5 can obtain a height (Z) of the small animal to be detected A by the expression Z=H−cos θ×n. The software processing detection algorithm 5 can obtain the intruding distance (M) by the expression M=sin θ×(L−n).

In step S7, the moving distance data (at least any one of the detecting distance immediately before the tracking of the object to be detected is stopped, the height of the object to be detected, and the intruding distance) is stored in the memory device such as the hard disk.

In step S8, it is determined whether the moving distance data reaches a predetermined value or not. If the moving distance data is less than the predetermined value, the routine returns to start. If the moving distance data is not less than the predetermined value, the routine is moved to step S9.

In step S9, it is determined whether human body detection output is performed or not. If it is determined that the human body detection output is not performed, the routine returns to start. If it is determined that the human body detection output is performed, the routine is moved to step S10.

In step S10, output processing such as relay output is performed. For example, the human body detection information is transmitted to the alarm device.

(3) Effects of the Invention

1) The laser sensor device 1 according to the present invention is a device which detects the target by emitting and receiving the laser beam and has the laser emitting and receiving portion (2, 3), the distance information obtaining portion, the tracking stop determining portion, and the target determining portion. The laser emitting and receiving portion (2, 3) can emit the laser emission light 14 diagonally downward from the installing position. The distance information obtaining portion can obtain distance information from the laser emitting and receiving portion (2, 3) to the object to be detected. The tracking stop determining portion, when the object to be detected approaches the laser emitting and receiving portion (2, 3), can determine whether the tracking of the object to be detected is stopped or not. The target determining portion, when the tracking of the object to be detected is stopped, can determine whether the object to be detected is the target or the non-target based on distance information immediately before the tracking of the object to be detected is stopped.

In the laser sensor device 1, the laser emission light 14 is emitted diagonally downward from the laser emitting and receiving portion (2, 3) so that a wide detecting range can be maintained. If the distance information immediately before the tracking of the object to be detected is stopped shows the predetermined length or above, it is determined that the object to be detected is the target. If the distance information immediately before the tracking of the object to be detected is stopped shows less than the predetermined length, it is determined that the object to be detected is the non-target. Therefore, misdetection can be reduced while maintaining a wide detecting range.

2) The target detecting method according to the present invention which detects the target by emitting the laser beam diagonally downward from the installing position of the laser emitting and receiving portion, includes the steps of: obtaining distance information from the laser emitting and receiving portion (2, 3) to the object to be detected; determining, when the object to be detected approaches the laser emitting and receiving portion, whether the tracking of the object to be detected is stopped or not (step S6 of FIG. 7); and determining, when the tracking of the object to be detected is stopped, whether the object to be detected is the target or the non-target based on distance information immediately before the tracking of the object to be detected is stopped (steps S6 and S7 of FIG. 7).

In the target detecting method, the laser beam is emitted diagonally downward from the laser emitting and receiving portion (2, 3) so that a wide detecting range can be maintained. If the distance information immediately before the tracking of the object to be detected is stopped shows the predetermined length or above, it is determined that the object to be detected is the target. If the distance information immediately before the tracking of the object to be detected is stopped shows less than the predetermined length, it is determined that the object to be detected is the non-target. Therefore, the misdetection can be reduced while maintaining a wide detecting range.

2. Other Embodiments

The present invention is not limited to the above embodiment and various changes and modifications can be made without departing from the scope of the present invention.

(1) In the above embodiment, the angle sensor is used as means for obtaining angle information. The following angle information obtaining means can be used.

1) There can be used an inputting portion, such as a switch, which is provided in the laser sensor device and can input angle information or an inputting device (a keyboard or a mouse) of the computer which is connected to the laser sensor device via a network and can set the angle information to the laser sensor device. In this laser sensor device, since a human inputs the angle information, special sensors are unnecessary and a cost is lowered.

2) A computing portion which computes an angle based on installing height information of the laser sensor device and distance information from the laser sensor device to the ground can be used. In this laser sensor device, since the angle can be computed based on other information, the special sensors are unnecessary and the cost is lowered.

(2) In the above embodiment, the laser sensor device is used alone. The following combinations may also be used.

1) A plurality of the laser sensor devices of the above embodiment can be combined.

2) The laser sensor device of the above embodiment and a laser sensor device which horizontally emits the laser emission light can be combined.

(3) In the above embodiment, detection is performed in the two-dimensional area by scanning with the laser beam. The following variations of the detecting position can also be provided.

1) Detection can be performed only at one point without moving the laser emission light. It is sufficiently effective when the guarding area is small like a gate.

2) Detection on the plane can be performed by moving the laser emission light up and down as well as right and left.

(4) In the above embodiment, when the moving line tracking of the object to be detected is stopped, at least any one of the distance information of the object to be detected immediately before the moving line tracking of the object to be detected is stopped, the height information of the object to be detected, and the intruding distance information is used to determine whether the object to be detected is the human or not. The following variations of the means for obtaining the height information and the intruding distance information are considered.

1) The height information and the intruding distance information are computed based on the distance information of the object to be detected immediately before the tracking is stopped.

2) A conversion table is prepared to take out the corresponding height information and intruding distance information from the conversion table based on the distance information of the object to be detected immediately before the tracking is stopped.

(5) In the above embodiment, the moving line tracking is performed. The moving line tracking is not necessarily performed.

(6) In the above embodiment, the angle θ of the direction of the laser emission light from the light emitting portion is secured in a predetermined range (for example, 10 to 80 degrees). The angle may have a small value close to 0 degrees. That is, the laser emission light performs illumination in an almost vertical direction (directly below). In this case, the detecting area becomes very small and the moving line tracking cannot be performed. When the object to be detected passes through the detecting area, detection and tracking stop are continuously performed. The height of the object to be detected can be detected from the detecting distance from the light emitting and receiving portion to the object to be detected immediately before the tracking stop. Therefore, the misdetection of the small animal is hard to occur.

The laser emission light may be directed in an almost vertical direction as a result of scanning with the laser emission light up and down or right and left by the scan mechanism, or as a result of the laser emitting and receiving portion illuminating only at one point almost directly therebelow.

(7) Scanning may be performed such that the angle of the direction of the laser emission light from the laser emitting and receiving portion is directed in a vertical direction (directly below) other than diagonally downward. The direction of the laser emission light may also be fixed in a vertical direction.

The target detecting device, the target detecting method, and the target detecting program according to the present invention are applicable to the guarding system.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A target detecting method for detecting a target by emitting a laser beam diagonally downward from an installing position of a laser emitting and receiving portion, the method comprising:

obtaining height information of the object to be processed, based on distance information from the laser emitting and receiving portion to the object to be detected;

determining, when the object to be detected approaches the laser emitting and receiving portion, that tracking of the object to be detected has stopped when no laser beam reflected from the object to be detected is received; and determining, upon the determination that the tracking of the object to be detected has stopped, whether the object to be detected is the target or a non-target based on height information obtained immediately before the tracking of the object to be detected has stopped, the target determining step, if the height information obtained immediately before the tracking of the object to be detected has stopped shows a predetermined length or above, determining that the object to be detected is the target, the target determining step, if the height information obtained immediately before the tracking of the object to be detected has stopped shows less that the predetermined length, determining that the object to be detected is the non-target.

2. The target detecting method according to claim 1, wherein the target determining step, when the laser emitting and receiving portion emits the laser beam in an almost vertical direction, determines whether the object to be detected is the target or the non-target using the height information immediately before the tracking of the object to be detected is stopped, as height information of the object to be detected.

3. A non-transitory computer readable medium storing a target detecting program that allows a computer to execute the target detecting method according to claim 1.

4. A non-transitory computer readable medium storing a target detecting program that allows a computer to execute the target detecting method according to claim 2.

* * * * *